UNITED STATES PATENT OFFICE 2,670,384

ACETYLENE PEROXIDES

Nicholas A. Milas, Belmont, Mass., assignor to Research Corporation, New York, N. Y., a corporation of New York No Drawing. Application September 24, 1951, Serial No. 248,090

13 Claims. (Cl. 260—610)

This invention relates to acetylene peroxides and to methods for making them.

Acetylene peroxides of the type described herein have not heretofore been known and it could not be predicted whether they would be stable enough to isolate. It is now possible to produce them in good yield by the methods of the invention and it is found that they are unusually stable in spite of the presence of acetylene groups in their molecules.

The peroxides of the invention may be prepared by allowing an acetylene carbinol (I) in which $R_1$ and $R_2$ are hydrocarbon radicals or an acetylene glycol (IV) in which $R_1$ and $R_2$ also represent hydrocarbon radicals to react with hydrogen peroxide at temperatures between $-10°$ and $+20°$ C. in the presence of mineral acids such as sulfuric and phosphoric acids to produce the acetylene hydroperoxides of the types (II) or (V) respectively, and in the case of acetylene carbinols also the peroxide (III). The reactions are illustrated by Equations 1 and 2:

(1)

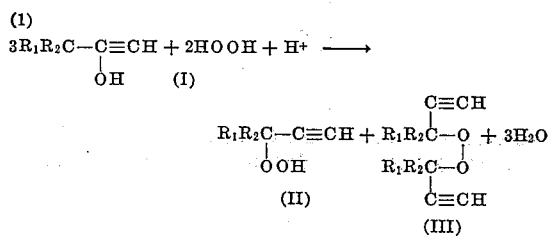

(2)

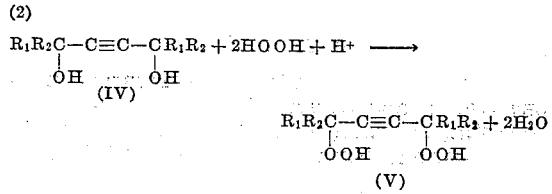

The peroxide (III) may also be prepared by allowing an equimolecular mixture of the hydroperoxide (II) and the carbinol (I) to react at low temperatures in the presence of a mineral acid as illustrated by Equation 3.

(3)

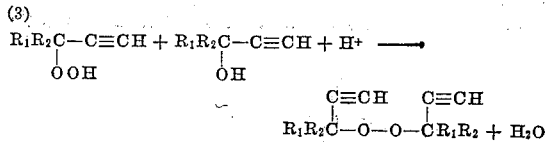

These peroxides can also be alkylated or esterified. An example of the alkylation of the peroxide (V) with t-butyl alcohol is given by Equation 4.

(4)

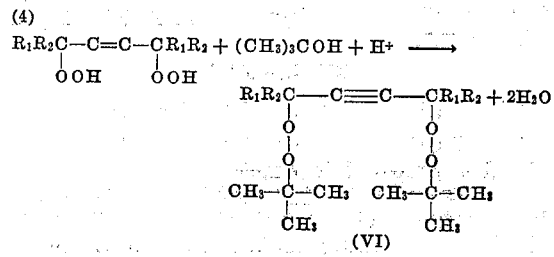

The acetylene peroxides of the present invention are useful for the synthesis of other useful organic compounds, as polymerizing catalysts in emulsions as well as in single phase systems, as bleaching agents and as germicides.

The principles of the invention are illustrated by the following specific examples:

EXAMPLE 1

*3-methyl-3-hydroperoxypentyne-1*

To a cold mixture (0° C.) of 30.6 g. of 50% hydrogen peroxide and 48 g. of 95.5% sulfuric acid is added dropwise with rapid stirring 20 g. of 3-methyl-3-hydroxypentyne-1

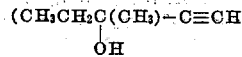

in the course of about one-half hour. The temperature of the mixture should not be allowed to rise above $+5°$ C. during the initial stages of the reaction. Stirring is continued for 4.5 hours longer then the mixture is diluted with an equal volume of saturated ammonium sulfate solution and extracted with ether. The ether extract is shaken with solid magnesium carbonate to remove traces of sulfuric acid, then dried over magnesium sulfate, filtered and the ether removed under reduced pressure; yield, 22 g. (94% of theory) of material. An active oxygen content of 11.9% corresponds to 85% of 3-methyl-3-hydroperoxypentyne-1. To purify it further it is fractionated under reduced pressure and the fraction boiling 38–40° C. (5 mm.) is collected; $n_D^{25}$, 1.4396; $d_4^{25}$, 0.9547. $MR_D$ (calcd.), 31.63; $MR_D$ (obsd.), 31.32.

Di-(3-methylpentynyl)-3-peroxide is also produced.

EXAMPLE 2

*3-methyl-3-hydroperoxybutyne-1*

Using the same technique and under the same conditions as those of Example 1, 20 g. of 3- methyl-3-hydroxybutyne-1 is allowed to react with a mixture of 35.44 g. of 50% hydrogen peroxide and 55.7 g. of 95.5% sulfuric acid. A yield of 23.3 g. (99.5% of theory) of crude product is obtained analyzing 80% of the hydroperoxide. This is further purified by distillation under reduced pressure and the fraction boiling at 40–42° C. (17 mm.) collected; $n_D^{25}$, 1.4289; $d_4^{25}$, 0.945. $MR_D$ (calcd.), 27.01. $MR_D$ (obsd.) 27.26.

The corresponding diacetylene peroxide is also formed.

EXAMPLE 3

*2,5-dimethyl-2,5-dihydroperoxyhexyne-3*

Using the same technique as that used in Example 1, 50 g. of 2,5-dimethyl-2.5-dihydroxyhexyne-3 (added in small portions in the course of one hour) is allowed to react with a mixture (maintained at —4° to —1° C.) of 52.5 g. of 50% hydrogen peroxide and 69 g. of 95.5% sulfuric acid. A yield of 52 g. (85% of theory) of solid product is obtained having a purity of 92%. This is recrystallized from benzene, M. P. 107–109° C. (decompn.).

EXAMPLE 4

*1,1'-dihydroperoxy-1,1'-dicyclohexylacetylene*

The dihydroperoxide of dicyclohexyl acetylene glycol is prepared in exactly the same manner as in Example 1. 1,1'-dihydroxy-1,1'-dicyclohexylacetylene (10 g.) is slowly added with rapid stirring to a mixture (maintained at 0° C.) of 9.6 g. of 50% hydrogen peroxide and 14 g. of 95.5% sulfuric acid. After four hours of stirring, the mixture is diluted with an equal volume of saturated solution of ammonium sulfate and extracted with ether. From the ether extract is obtained 9 g. of solid product having a purity of 85%. This is recrystallized from cyclohexane; M. P. 95° C. (decompn.).

EXAMPLE 5

*Di-(3-methylbutynyl)-3-peroxide*

To 12.7 g. of 70% sulfuric acid maintained between —3° and 0° C. was added dropwise with rapid stirring a mixture of 6.05 g. of 3-methyl-3-hydroperoxybutyne-1 (prepared under Example 2) and 5.07 g. of 3-methyl-3-hydroxybutyne-1 in the course of one-half hour. Stirring is continued at 0° C. for 4.5 hours longer; then the mixture is diluted with two volumes of water and extracted with low boiling petroleum ether. The petroleum ether extract is shaken with two portions of 10% sodium hydroxide to remove the unused hydroperoxide, washed with water and dried. Finally, the petroleum ether is removed, the residue distilled under reduced pressure and the portion boiling at 60° C. (76 mm.) collected.

EXAMPLE 6

*2,5-dimethyl-2,5-di(t-butylperoxy)-hexyne-3*

To a cold mixture (0° C.) of 6 g. of t-butyl alcohol and 11.2 g. of 70% sulfuric acid is slowly added with stirring 4.7 g. of 2,5-dimethyl-2,5-dihydroperoxyhexyne-3 in the course of 15 minutes. The mixture is then allowed to stir at room temperature for five hours; then diluted with two volumes of water and extracted with ethyl ether. The ether solution is washed with water, dried and the ether removed. A yield of 6.8 g. (88.3% of theory) is obtained. The peroxide is distilled under reduced pressure and the fraction boiling at 65–67° C. (2 mm.) collected; $n_D^{25}$, 1.4219; $d_4^{25}$, 0.881. $MR_D$ (calcd.), 81.78. $MR_D$ (obsd.), 82.61.

I claim:

1. Acetylene peroxides characterized by having at least one tertiary carbon atom having a peroxy group and an acetylenic group attached thereto.

2. Acetylene peroxides of the general formula

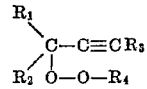

wherein $R_1$ and $R_2$ represent hydrocarbon radicals, and $R_3$ and $R_4$ are selected from the group consisting of hydrogen and hydrocarbon radicals.

3. Acetylene peroxides of the general formula

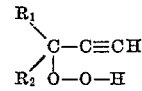

wherein $R_1$ and $R_2$ are hydrocarbon radicals.

4. Acetylene peroxides of the general formula

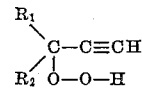

wherein $R_1$ and $R_2$ are alkyl radicals.

5. Acetylene peroxides of the general formula

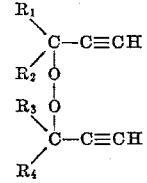

wherein $R_1$, $R_2$, $R_3$ and $R_4$ are hydrocarbon radicals.

6. Acetylene peroxides of the general formula

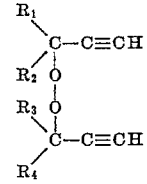

wherein $R_1$, $R_2$, $R_3$ and $R_4$ are alkyl radicals.

7. Acetylene peroxides of the general formula

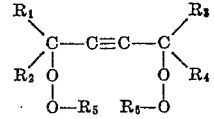

wherein $R_1$, $R_2$, $R_3$ and $R_4$ are hydrocarbon radicals and $R_5$ and $R_6$ are selected from the group consisting of hydrogen and hydrocarbon radicals.

8. Acetylene peroxides of the general formula

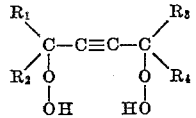

wherein $R_1$, $R_2$, $R_3$ and $R_4$ are hydrocarbon radicals.

9. Acetylene peroxides of the general formula

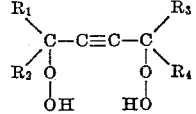

wherein $R_1$, $R_2$, $R_3$ and $R_4$ are alkyl radicals.

10. A method of making acetylene peroxides which comprises reacting at a temperature not exceeding about 20° C. in the presence of a mineral acid hydrogen peroxide and an acetylene carbinol of the general formula

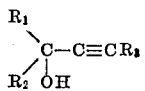

wherein $R_1$ and $R_2$ are hydrocarbon radicals and $R_3$ is selected from the group consisting of hydrogen and hydrocarbon radicals.

11. A method of making acetylene peroxides which comprises reacting at a temperature not exceeding about 20° C. in the presence of a mineral acid hydrogen peroxide and an acetylene carbinol of the general formula

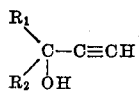

wherein $R_1$ and $R_2$ are alkyl radicals.

12. A method of making acetylene peroxides which comprises reacting at a temperature not exceeding about 20° C. in the presence of a mineral acid hydrogen peroxide and an acetylene carbinol of the general formula

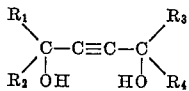

wherein $R_1$, $R_2$, $R_3$ and $R_4$ are hydrocarbon radicals.

13. A method of making acetylene peroxides which comprises reacting at a temperature not exceeding about 20° C. in the presence of a mineral acid hydrogen peroxide and an acetylene carbinol of the general formula

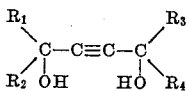

wherein $R_1$, $R_2$, $R_3$ and $R_4$ are alkyl radicals.

NICHOLAS A. MILAS.

References Cited in the file of this patent

UNITED STATES PATENTS

| Number | Name | Date |
|---|---|---|
| 2,516,649 | Rust et al. | July 25, 1950 |

OTHER REFERENCES

Piganiol, Acetylene Homologs and Derivatives 121 H22 (1950).